Patented June 28, 1927.

1,634,122

UNITED STATES PATENT OFFICE.

EARL P. STEVENSON, OF NEWTON, MASSACHUSETTS, ASSIGNOR TO ARTHUR D. LITTLE, INC., OF CAMBRIDGE, MASSACHUSETTS, A CORPORATION OF MASSACHUSETTS.

METHOD OF PRODUCING SODIUM FLUORIDE.

No Drawing. Application filed October 8, 1921, Serial No. 506,360. Renewed December 1, 1926.

The present invention relates to a process for the recovery of certain useful products from waste gases necessarily associated with the manufacture of acid phosphate.

It will be understood by those skilled in the art that the conversion of natural calcium phosphate into acid phosphate for use in commercial fertilizers causes the evolution of fluorine gases due to the reaction of sulphuric acid employed in the conversion process with calcium fluoride present in the natural rock. This reaction gives hydrogen fluoride which reacts to a considerable degree with the free silica or silicates also present in the rock to form the gas known as silicon tetrafluoride. As this mixture of silicon tetrafluoride and hydrogen fluoride gas is not only very obnoxious but also quite toxic, it is necessary in actual practice to collect the gases by means of a ventilating system and scrub the resulting mixture with a water spray to effect the removal of the fluorine gases before discharge of the evolved gases into the atmosphere.

One feature of my invention contemplates the conversion of these waste and obnoxious gases into a useful and merchantable product such as sodium fluoride. This sodium fluoride may be utilized for a variety of purposes and has especial utility in connection with wood preservation, for which purpose it possesses certain distinct advantages over materials now employed. By virtue of my new process, this sodium fluoride which is now practically prohibitive in price may be produced from the waste gases at a cost which will enable it to commercially compete with other products now employed for the same purpose. Attempts have been made heretofore to convert the waste gases evolved in the production of acid phosphate into merchantable products, among which may be noted the recovery of sodium fluosilicate from the liquors delivered by the scrubbing towers. This method of conversion has only solved the problem to a very limited degree, however, as the market for sodium fluosilicate is incapable of absorbing but a small portion of the product that would result from a universal adoption of this process in the acid phosphate industry.

A further feature of my invention is concerned with the treatment of the solution remaining after separation of the sodium fluoride. As this solution is normally saturated with sodium fluoride and also carries additional values it will be obvious to those skilled in the art that such a further treatment is highly desirable.

According to the new process which I employ, the solution of hydrofluosilicic acid, which is obtained by spraying a gas containing silicon tetrafluoride with water, is treated with a solution of sodium chloride to form sodium fluosilicate, which, being insoluble, is precipitated from the solution. This sodium fluosilicate if next treated with a hot solution of sodium carbonate is decomposed to form sodium fluoride and hydrosilicic acid or hydrated silica. In order to obtain sodium fluoride free from contamination with silica a hot solution of caustic soda is employed to dissolve the silicic acid, forming sodium silicate which is water soluble and which may be filtered off from the sodium fluoride. Although sodium fluoride is to a certain extent water soluble nevertheless to a large degree it remains behind as an insoluble residue when the solution of sodium silicate is filtered off. The filtrate remaining after the separation of the sodium fluoride may be treated with carbon dioxide which is available from the decomposition of the sodium fluoride with sodium carbonate. This treatment of the filtrate with carbon dioxide decomposes the sodium silicate and precipitates a form of hydrosilicic acid, which may be filtered off and the resulting filtrate, carrying sodium fluoride sodium carbonate, and sodium bicarbonate returned to the system. This treatment of the filtrate, as will be obvious to those skilled in the art, produces resulting economies in the chemicals employed and also increases the recovery of sodium fluoride.

The several reactions which take place in carrying out the improved process are briefly outlined in the following equations, starting with the recovered solution of hydrofluosilicic acid which is treated with sodium chloride, sodium fluosilicate is obtained according to the following reaction:

(1) 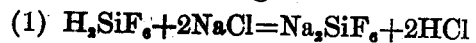 $H_2SiF_6 + 2NaCl = Na_2SiF_6 + 2HCl$

This wet sodium fluosilicate is next treated with a hot solution of sodium carbonate which decomposes it to form sodium fluoride and hydrosilicic acid, evolving carbon dioxide in the reaction.

(2) $Na_2SiF_6 + 2Na_2CO_3 = 3Na_2F_2 + Si(OH)_4 + 2CO_2$

The addition of a hot solution of sodium hydroxide dissolves the hydrosilicic acid to form water soluble sodium silicate according to the equation:

(3) $Si(OH)_4 + 2NaOH = Na_2SiO_3 + 3H_2O$

I have also found that the hydrosilicic acid from the decomposed sodium fluosilicate can be dissolved with less caustic than indicated by equation (3), as for example:

(4) $3Si(OH)_4 + 2NaOH = Na_2O.3SiO_2 + 7H_2O$

This solution may be filtered off leaving the sodium fluoride to a large degree remaining as an insoluble residue. The filtrate from the sodium fluoride is then treated with carbon dioxide to decompose the solution of sodium silicate, as (5) $Na_2SiO_3 + 2CO_2 + 3H_2O = 2NaHCO_3 + Si(OH)_4$ An alternative method for treating the silicate solution would be to decompose the silicate with lime as:

(6) $Na_2SiO_3 + Ca(OH)_2 = CaSiO_3 + 2NaOH$

The calcium silicate thus formed is insoluble and may be separated from the regenerated caustic solution by filtration.

It will be obvious that the most economical operation of the process requires means for keeping the sodium fluoride dissolved in the sodium silicate solution within the system, also that the soda combined with the silica should be converted into a form available for re-use. In the case of the carbon dioxide treatment, the filtrate can be used in making up fresh solutions of sodium carbonate as required by equation (2) and in the case of the lime treatment the regenerated caustic can be employed to dissolve the hydrosilicic acid from subsequent quantities of decomposed sodium fluosilicate.

It should be understood by those skilled in the art that certain features of my invention may be advantageously employed in the production of sodium fluoride from sources other than the gases evolved in the manufacture of acid phosphate.

What is claimed is:

1. A process for the conversion of waste gases evolved in the manufacture of acid phosphates which consists in initially treating the waste gases to form sodium fluosilicate, decomposing the sodium fluosilicate into sodium fluoride and hydrosilicic acid by treatment with sodium carbonate, next treating the hydrosilicic acid with caustic soda to convert it into a soluble silicate, separating the alkali solution of the silicate from the sodium fluoride, and finally treating the alkali solution with carbon dioxide to precipitate hydrosilicic acid and leave a solution of sodium bicarbonate suitable for conversion into carbonate for re-use in the process.

2. A process for obtaining sodium fluoride from sodium fluosilicate which consists in decomposing the fluosilicate into sodium fluoride and hydrosilicic acid by treatment with a carbonate evolving carbon dioxide in the reaction, next treating the hydrosilicic acid with a caustic reagent to convert it into a soluble silicate, separating the alkali solution of the silicate from the sodium fluoride, and finally treating the filtrate with carbon dioxide to decompose the silicate and form a bicarbonate suitable for conversion into carbonate for re-use in the process.

EARL P. STEVENSON.